(12) United States Patent
Chen et al.

(10) Patent No.: US 7,840,103 B2
(45) Date of Patent: Nov. 23, 2010

(54) PERFORMANCE COMPENSATED TX/RX OPTICAL DEVICES

(75) Inventors: Wei Chen, Ellicott City, MD (US); Jeff Rahn, Sunnyvale, CA (US); Stephen G. Grubb, Reisterstown, MD (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 11/966,329

(22) Filed: Dec. 28, 2007

(65) Prior Publication Data

US 2009/0169211 A1 Jul. 2, 2009

(51) Int. Cl.
G02B 6/28 (2006.01)
H04J 14/02 (2006.01)

(52) U.S. Cl. ............... 385/24; 385/1; 385/2; 385/3; 385/40; 385/42; 385/129; 385/130; 398/79; 398/81; 398/85

(58) Field of Classification Search ............ 385/1, 385/2, 3, 15, 16, 8, 9, 24, 40, 41, 42, 47, 385/49, 129, 130, 131, 132; 398/79, 81, 398/82, 85; 359/337.5, 338, 339, 341.1, 359/346

See application file for complete search history.

(56) References Cited

U.S. PATENT DOCUMENTS

| | | | |
|---|---|---|---|
| 5,943,151 A * | 8/1999 | Grasso et al. ............... 398/147 |
| 6,538,788 B2 * | 3/2003 | Franco et al. ............... 398/158 |
| 7,221,820 B2 * | 5/2007 | Boertjes et al. ............... 385/24 |
| 7,272,327 B2 * | 9/2007 | Epworth et al. ............. 398/212 |
| 7,466,920 B2 * | 12/2008 | Ooi et al. ....................... 398/81 |
| 7,555,178 B2 * | 6/2009 | Chen ............................ 385/27 |
| 2001/0048786 A1 | 12/2001 | Arai et al. ..................... 385/24 |
| 2002/0177665 A1 | 11/2002 | Beccarini et al. ............. 525/240 |
| 2004/0042799 A1 | 3/2004 | Sardesai et al. ............. 398/141 |
| 2004/0151426 A1 * | 8/2004 | Boertjes et al. ............... 385/24 |
| 2009/0022454 A1 * | 1/2009 | Chen ............................ 385/24 |

FOREIGN PATENT DOCUMENTS

| GB | 2309131 A | 7/1997 |
|---|---|---|
| GB | 2319419 A | 5/1998 |

* cited by examiner

*Primary Examiner*—Brian M Healy
(74) *Attorney, Agent, or Firm*—Dunlap Codding, P.C.; David L. Soltz

(57) ABSTRACT

A wavelength division multiplexing system has a wavelength division multiplexer and a wavelength division demultiplexer. The wavelength division demultiplexer is in series with the wavelength division multiplexer to process at least one optical signal to generate at least one processed optical signal. The wavelength division multiplexer and the wavelength division demultiplexer cooperate to introduce substantially zero total chromatic dispersion in the processed optical signal. In one version, the wavelength division multiplexer and the wavelength division demultiplexer introduce opposing functions of chromatic dispersion into the at least one processed optical signal.

22 Claims, 7 Drawing Sheets

PERFORMANCE COMPENSATED TX/RX OPTICAL DEVICES

CROSS-REFERENCE TO RELATED APPLICATIONS

Not Applicable.

STATEMENT REGARDING FEDERALLY SPONSORED RESEARCH OR DEVELOPMENT

Not Applicable.

NAMES OF THE PARTIED TO A JOINT RESEARCH AGREEMENT

Not Applicable.

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE OF THE MATERIAL ON THE COMPACT DISC (SEE §1.52(E) (5))

Not Applicable.

BACKGROUND OF THE INVENTION

Planar light-wave circuits, also known as planar light-wave chips (PLCs), are optical devices having optical components and networks disposed monolithically within stack(s) of optical thin films and supported by a common mechanical substrate such as a semiconductor or glass wafer. PLCs are typically designed to provide specific transport or routing functions within fiber-optic communications networks. These networks are distributed over a multitude of geographically-dispersed terminals and commonly include transport between terminals via single-mode optical fibers.

Wavelength-division multiplexing (WDM) is a commonly employed technology within telecommunication systems that provides transmission of multiple optical signals on a signal optical fiber by using different wavelengths to carry different signals. In the WDM system, each optical carrier signal is transmitted within a narrow wavelength band centered around a center wavelength. Each band is commonly referred to as an optical channel and is generally characterized or referred to by a single center wavelength ($\lambda_x$).

The WDM system uses a multiplexer to join the optical carrier signals together for transmission over the single optical fiber while a demultiplexer is used to split the optical carrier signals apart. The multiplexer takes the optical signal having different channels and combines them for transmission over the single optical fiber. The demultiplexer performs the reverse application and splits the signal into multiple optical signals. In this regard, WDM systems allow capacity expansion of the network without having to lay out more optical fibers since capacity of a given link can be expanded by simply upgrading the multiplexers and demultiplexers.

Optical filters serve as components in the WDM systems that provide the signal processing functions needed in multiplexing/demultiplexing, balancing of signal power, adding and/or dropping of channels, and the like.

The design goal of an optical filter for a WDM system application is to provide a passband having a wide, nearly flat top with minimum insertion loss and rapid rolloff on the band edges, while minimizing chromatic dispersion across the passband.

Ring-assisted MZ filters are currently being practiced in the art to provide wide, nearly flat top passbands with high extinction ratios. See, Jinguji, K. et al. "Optical Half-Band Filter", J. Lightwave Technol. Vol. 18, 252-259 (2000); See, Wang, Qi, et al. "Design of 100/300 GHz optical interleaver with IIR architectures", Optics Express, Vol. 13, (March 2005). However, there is difficulty in minimizing the chromatic dispersion across the passband of a ring-assisted MZ filter.

Within communication systems, chromatic dispersion in an optical fiber or within other optical components limits pulse propagation distances and/or bit rates. Dispersion is generally wavelength-dependent and causes a broadening of the optical signal as it propagates along the length of the optical fiber. Different wavelengths travel at different speeds along the length of the optical fiber, and as signals broaden due to dispersion, it may become difficult to distinguishing one pulse from another.

In light of the foregoing, there is a need to reduce the amount of chromatic dispersion in the optical signal to increase pulse propagation distances and/or bit rates.

BRIEF SUMMARY OF THE INVENTION

In one embodiment, the present invention is directed to a signal processing system having a passband for de-multiplexing and multiplexing at least one optical signal. The signal processing system is provided with a demultiplexer and a multiplexer. The demultiplexer has an input port to receive an optical signal, an output port having a plurality of branches to provide a plurality of demultiplexed optical signals, and demultiplexing circuitry coupled between the input port and the output port for demultiplexing the optical signal received at the input port to provide the plurality of demultiplexed optical signals to the branches of the output port. The demultiplexing circuitry introduces a first function of chromatic dispersion within the passband into the demultiplexed optical signals, The multiplexer has an input port having a plurality of branches receiving the plurality of demultiplexed optical signals, and an output port to provide a multiplexed optical signal, and multiplexing circuitry coupled between the branches of the input port of the multiplexer and the output port of the multiplexer for multiplexing the plurality of demultiplexed optical signals received by the branches of the input port to provide the multiplexed optical signal to the output port. The multiplexing circuitry introduces a second function of chromatic dispersion into the multiplexed optical signal such that a total function of chromatic dispersion within the passband in the multiplexed optical signal is less than the first function of chromatic dispersion within the passband. In a preferred embodiment, the demultiplexing circuitry and the multiplexing circuitry use different architectures and have different filter characteristics as shown in FIGS. 7 and 8. For example, the demultiplexing circuitry can use an architecture based upon the use of one or more ring-assisted mach zehnder filter while the multiplexing circuitry uses an architecture based upon the use of one or more non-ring assisted mach-zehnder filters. In one version, the total function of chromatic dispersion in the multiplexed optical signal introduced by the demultiplexing circuitry and the multiplexing circuitry is substantially zero across the passband of the signal processing system, e.g., ±8 Ghz bandwidth.

In one version, the demultiplexing circuitry comprises a first directional coupler, a second directional coupler, a first differential phase cell and a resonator. The first directional coupler receives the optical signal from the branches and the second directional coupler provides the plurality of demultiplexed optical signals to the output port. The first differential phase cell connects the first directional coupler and the second directional coupler. The first differential phase cell has a first arm with a path length $L_1$ and a second arm with a path length $L_2$, wherein the path lengths $L_1$ and $L_2$, are unequal so as to provide a first phase response to the optical signal. The resonator is optically coupled to the second arm of the first differential phase cell. The resonator has a path length $L_R$ so as to provide a second phase response to the optical signal. The first differential phase cell, the first directional coupler and the second directional coupler can be defined by a first waveguide and a second waveguide. In one embodiment, the first differential phase cell connects the first directional coupler and the second directional coupler demultiplexer to form a ring-assisted Mach-Zehnder filter.

In another version, the demultiplexing circuitry further comprises a first tunable element and a second tunable element. The first tunable element is in thermal communication with the first arm of the first differential phase cell, and the second tunable element is in thermal communication with the resonator. At least one of the first tunable element and the second tunable element are tuned to adjust at least one of the first and second phase responses such that the first and second phase responses are substantially equal within the demultiplexed optical signal provided at the output end of the second directional coupler. In one embodiment, the at least one of the first tunable element and the second tunable element is a thermal device.

In yet another version, the signal processing system is provided with a controller selectively providing a signal to at least one of the first tunable element and the second tunable element to adjust power dissipation. In one version, the controller selectively provides the signal to at least one of the first tunable element and second tunable element based on bit rate error within the filtered signal.

The multiplexing circuitry can include a third directional coupler, a fourth directional coupler and a second differential phase cell. The third directional coupler receives the demultiplexed optical signal and the fourth directional coupler provides at least one filtered signal. The second differential phase cell connects the third directional coupler and the fourth directional coupler. The second differential phase cell has a third arm with a path length $L_3$ and a fourth arm with a path length $L_4$, wherein the path lengths $L_3$ and $L_4$, are unequal.

In another embodiment, the signal processing system demultiplexes and multiplexes at least one optical signal. The multiplexer has an input port having a plurality of branches receiving a plurality of demultiplexed optical signals, an output port to provide a multiplexed optical signal, and multiplexing circuitry coupled between the input port of the multiplexer and the output port of the multiplexer for multiplexing the plurality of demultiplexed optical signals received by the branches of the input port to provide the multiplexed optical signal to the output port. The multiplexing circuitry introduces a first function of chromatic dispersion into the multiplexed optical signal.

The demultiplexer has an input port to receive the multiplexed optical signal, an output port having a plurality of branches to provide a plurality of demultiplexed optical signals, and demultiplexing circuitry coupled between the input port and the branches of the output port for demultiplexing the multiplexed optical signal received at the input port to provide the plurality of demultiplexed optical signals to the branches of the output port. The demultiplexing circuitry introduces a second function of chromatic dispersion into the demultiplexed optical signals such that a total function of chromatic dispersion in the demultiplexed optical signals is less than the first function of chromatic dispersion. In one embodiment, the total amount of chromatic dispersion in the demultiplexed optical signals introduced by the demultiplexing circuitry and the multiplexing circuitry is substantially zero.

In one version, the demultiplexing circuitry is provided with a first directional coupler, a second directional coupler, a first differential phase cell and a resonator. The first directional coupler receives the multiplexed optical signal and the second directional coupler provides the plurality of demultiplexed optical signals. The first differential phase cell connects the first directional coupler and the second directional coupler. The first differential phase cell has a first arm with a path length $L_1$ and a second arm with a path length $L_2$, wherein the path lengths $L_1$ and $L_2$, are unequal so as to provide a first phase response to the optical signal. The resonator is optically coupled to the second arm of the first differential phase cell. The resonator has a path length $L_R$ so as to provide a second phase response to the optical signal.

The demultiplexing circuitry can optionally be provided with a first tunable element, a second tunable element and a controller. The first tunable element is in thermal communication with the first arm of the first differential phase cell. The second tunable element is in thermal communication with the resonator. At least one of the first tunable element and the second tunable element are tuned to adjust at least one of the first and second phase responses such that the first and second phase responses are substantially equal within the demultiplexed optical signal.

In another version, the present invention is directed to a wavelength division multiplexing system having a passband for processing at least one optical signal comprising a wavelength division multiplexer, and a wavelength division demultiplexer in series to process at least one optical signal to generate at least one processed optical signal. The wavelength division multiplexer and the wavelength division demultiplexer are constructed with different architectures and cooperate to introduce substantially zero total chromatic dispersion within the passband in the processed optical signal. In one embodiment, the wavelength division multiplexer and the wavelength division demultiplexer introduce opposing functions of chromatic dispersion into the at least one processed optical signal. In a preferred embodiment, the wavelength division multiplexer and the wavelength division demultiplexer have different filter characteristics.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Figure 1:
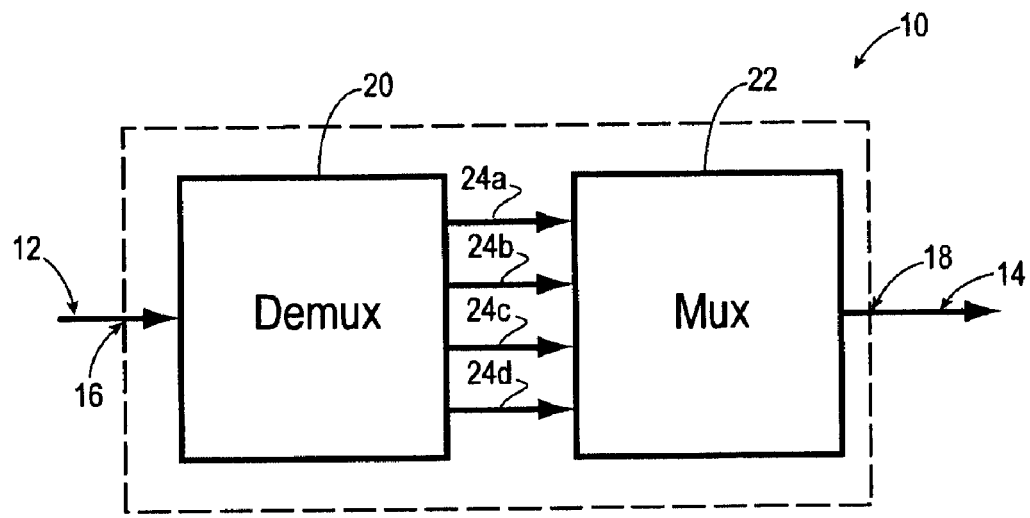
FIG. 1 is a schematic block diagram of an exemplary signal processing system for multiplexing and demultiplexing optical signals to provide a filtered signal in accordance with the present invention.

Exemplary embodiments of the invention are shown in the above-identified Figures and described in detail below. In describing the exemplary embodiments, like or identical reference numerals are used to identify common or similar elements. The Figures are not necessarily to scale and certain features and certain views of the Figures may be shown exaggerated in scale or in schematic in the interest of clarity and conciseness.

Figure 9:
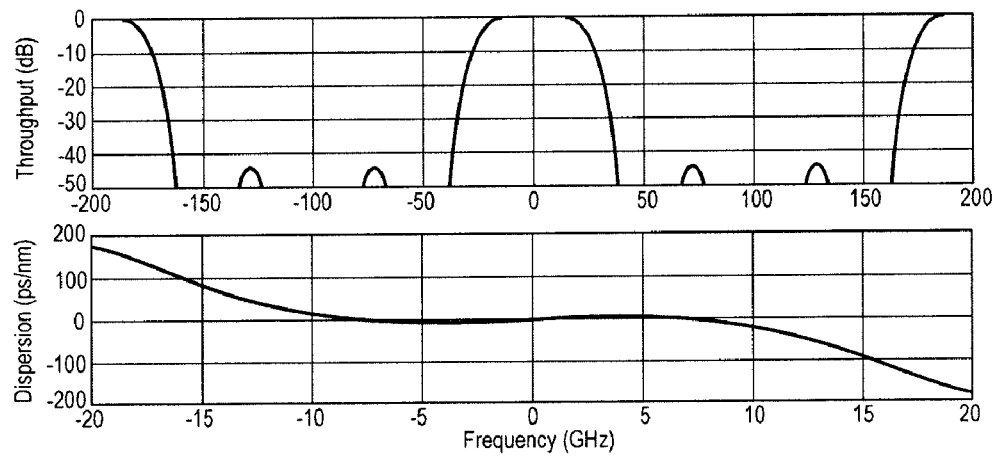
FIG. 9 is a diagram and optical response of a signal processing system in accordance with the present invention.

Referring now to the drawings, and in particular to FIG. 1, shown therein and designated by reference numeral 10 is an exemplary signal processing system having a passband (e.g., see FIG. 9) for demultiplexing and then multiplexing at least one optical signal 12 to provide at least one filtered optical signal 14 having minimal chromatic dispersion induced by the signal processing system 10 for transmission over an optical fiber in accordance with the invention. In general, the signal processing system 10 receives the optical signal 12 through the input port 16, filters the optical signal 12, and provides the resulting multiplexed signal 14 through the output port 18. The signal processing system 10 includes at least one demultiplexer 20 and at least one multiplexer 22.

In one version of the signal processing system 10, as illustrated in FIG. 1, the demultiplexer 20 provides a first filtering function on the optical signal 12 to separate the optical signal 12 into a plurality of demultiplexed optical signals 24a-d. The demultiplexed optical signals 24a-d are transmitted to the multiplexer 22. The multiplexer 22 provides a second filtering function on the demultiplexed optical signals 24a-d, and provides the resulting filtered optical signal 14 at the output port 18. The design and placement of the demultiplexer 20 and the multiplexer 22 minimize chromatic dispersion induced into the filtered optical signal 14 by the demultiplexer 20 and the multiplexer 22 while retaining a relatively flat passband and steep rolloff. That is, the demultiplexer 20 and the multiplexer 22 each introduce respective first and second functions of chromatic dispersion into the optical signal 12 and the demultiplexed optical signals 24a-d respectively. However, the design of the multiplexer 22 compensates for the chromatic dispersion introduced by the demultiplexer 20 such that a total function of chromatic dispersion within the passband, e.g., the summation of the first and second functions of chromatic dispersion within the passband is less than the first function of chromatic dispersion and preferably is nearly zero.

Figure 2:
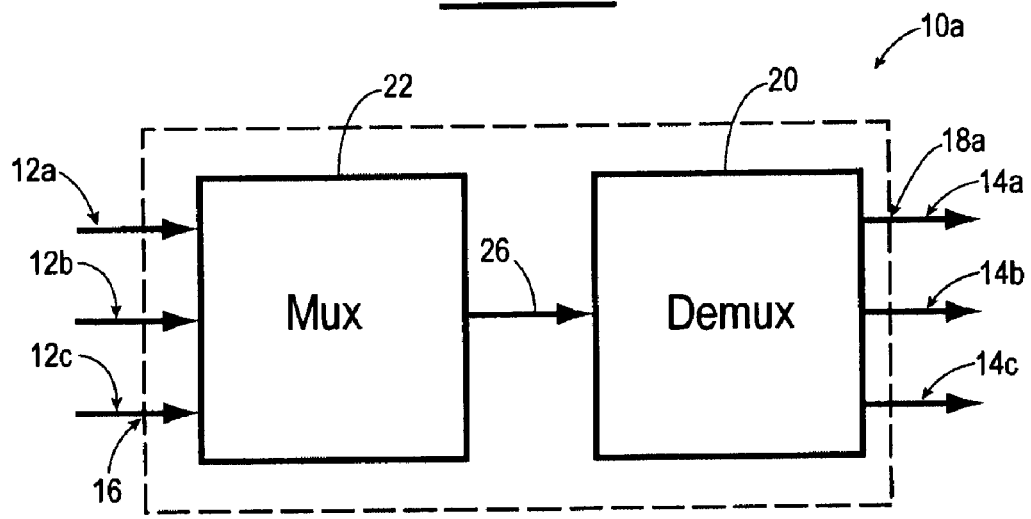
FIG. 2 is a schematic block diagram of an another exemplary signal processing system for multiplexing and demultiplexing optical signals to provide a filtered signal in accordance with the present invention.

Depicted in FIG. 2 is another version of a signal processing system 10a constructed in accordance with the present invention. As illustrated in FIG. 2, the signal processing system 10a has a passband (e.g., see FIG. 9) and includes the demultiplexer 20 and the multiplexer 22. In the signal processing system 10a, the multiplexer 22 receives a plurality of optical signals, which are identified in FIG. 2 by the reference numerals 12a-c. The multiplexer 22 provides a first filtering function on the optical signals 12a-c so as to transmit at least one multiplexed optical signal 26 to the demultiplexer 20. The demultiplexer 20 provides a second filtering function on the multiplexed optical signal 26, and provides a plurality of resulting filtered optical signals 14a-c at an output port 18a of the signal processing system 10a. As previously discussed, That is, the multiplexer 22 and the demultiplexer 20 each introduce respective first and second functions of chromatic dispersion into the optical signals 12a-c and the multiplexed optical signal 26 respectively. However, the design of the multiplexer 22 compensates for the chromatic dispersion introduced by the demultiplexer 20 such that a total function of chromatic dispersion within the passband, e.g., the summation of the first and second functions of chromatic dispersion within the passband is less than the first function of chromatic dispersion and preferably is nearly zero The demultiplexer 20 has an input port, a plurality of output ports, and demultiplexing circuitry coupled between the input port and the output ports for demultiplexing the optical signal 12 (in the case of the signal processing system 10) or the multiplexed optical signal 26 (in the case of the signal processing system 10a). The demultiplexing circuitry introduces a first function of chromatic dispersion within the passband into the demultiplexed optical signal 24a-d.

The multiplexer 22 has an input port, an output port, and multiplexing circuitry coupled between the input port of the multiplexer and the output port of the multiplexer for multiplexing the plurality of demultiplexed optical signals 24a-d (in the case of the signal processing system 10) or the optical signals 12a-c (in the case of the signal processing system 10a). The multiplexing circuitry introduces a second function of chromatic dispersion within the passband into the multiplexed optical signal. The second function of chromatic dispersion has a magnitude and a sign, i.e., either positive or negative. The sign of the first function of chromatic dispersion is opposite to the sign of the second function of chromatic dispersion.

Figure 7:
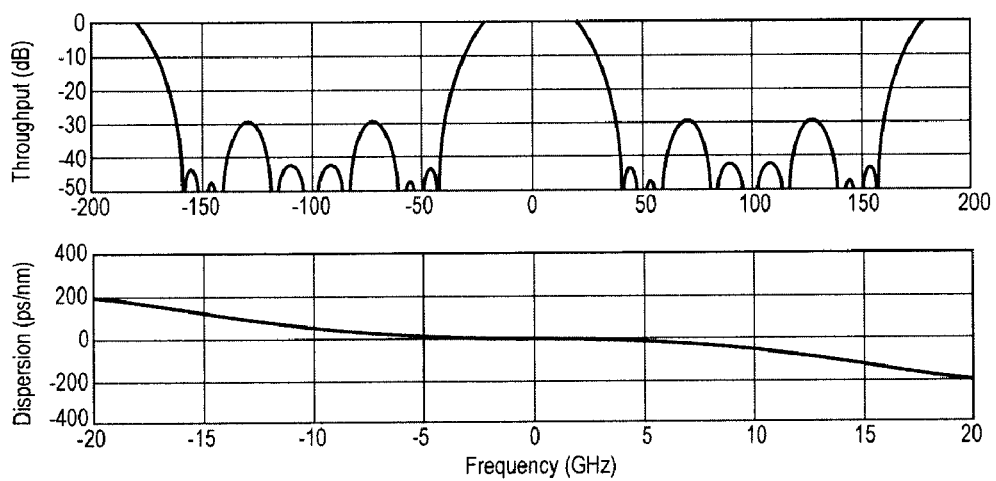
FIG. 7 is a diagram and optical response of a demultiplexer in accordance with the present invention.
Figure 8:
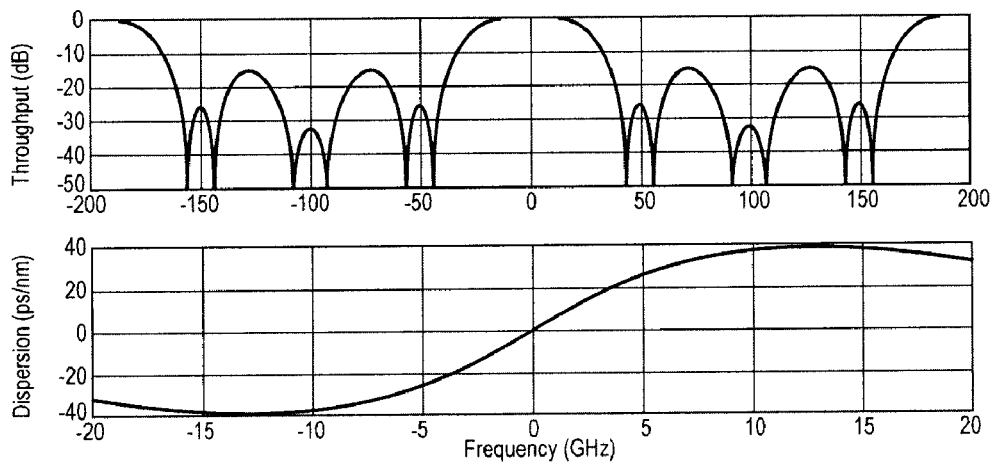
FIG. 8 is a diagram and optical response of a multiplexer in accordance with the present invention.

In a preferred embodiment, the demultiplexing circuitry and the multiplexing circuitry use different architectures and have different filter characteristics as shown in FIGS. 7 and 8. In one version, the total function of chromatic dispersion in the multiplexed optical signal introduced by the demultiplexing circuitry and the multiplexing circuitry is substantially zero across the passband of the signal processing systems 10 and 10a, e.g., ±8 Ghz bandwidth.

In designing the signal processing systems 10 and 10a to minimize total chromatic dispersion, the demultiplexing circuitry of the demultiplexer 20 desirably includes at least one ring-assisted MZ filter and the multiplexing circuitry of the multiplexer 22 desirably includes at least one non-ring assisted MZ filter. The use of both non-ring assisted MZ filters and ring-assisted MZ filters cooperatively provide the filtered signal 14 with a relatively flat passband, steep rolloff, and minimal total chromatic dispersion. Further, the use of at least one ring-assisted MZ filter in the demultiplexing circuitry desirably provides a high extinction ratio between channels providing greater clarity in the demultiplexed optical signals 24a-d. It should be noted, that the use of at least one ring-assisted MZ filter in the demultiplexing circuitry is not required, as an MZ filter of several orders can be used. Selection of the type of filter used may depend on design considerations.

It should be understood that both non-ring assisted MZ filters and ring-assisted MZ filters have been used in the art separately for multiplexing and demultiplexing optical signal(s) 12. Each filter design provides desired characteristics for multiplexing and demultiplexing. For example, ring-assisted MZ filters are commonly used for their desired characteristics of a relative flat passband with steep roll off. However, it has been determined that ring-assisted MZ filters cause an accumulation of chromatic dispersion if solely used in the design of the signal processing system 10. Thus, in one embodiment, the present signal processing systems 10 and 10a combine the desired characteristics of the non-ring assisted MZ filter(s) with the ring-assisted MZ filters to minimize total chromatic dispersion within the passband in the resulting filtered signals 14 or 14a-c while providing a relatively flat passband and steep roll off.

Figure 3:
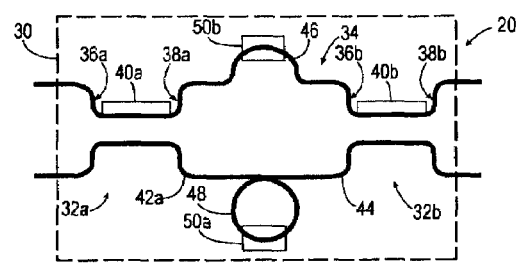
FIG. 3 is a schematic diagram of an exemplary demultiplexer for use in the signal processing systems of FIG. 1 and FIG. 2.

FIG. 3 illustrates one version of the de-multiplexer 20 suitable for use in the signal processing system 10. The demultiplexing circuitry of the de-multiplexer 20 includes at least one ring-assisted MZ filter 30. The ring-assisted MZ filter 30 includes at least two directional couplers, designated by reference numerals 32a and 32b, and at least one differential phase cell 34 interleaved between the directional couplers 32a and 32b. Each directional coupler 32a and 32b has an input port, an output port, and a coupling region. In particular, directional coupler 32a has an input port 36a, an output port 38a, and a coupling region 40a. In the same regard, directional coupler 32b has an input port 36b, an output port 38b, and a coupling region 40b.

The differential phase cell 34 connects directional couplers 32a and 32b by connecting the output port 38a of the directional coupler 32a with the input port 36b of the directional coupler 32b. In a preferred embodiment, the directional couplers 32a and 32b and the differential phase cell 34 are constructed from a first waveguide 42a and a second waveguide 42b. The differential phase cell 34 includes a first arm 44 formed from a portion of the first waveguide 42a and a second arm 46 formed from a portion of the second waveguide 42b. The differential phase cell arms 44 and 46 have lengths $L_1$ and $L_2$ having a differential path length $\Delta L$. The differential phase cell 34 causes a differential phase shift and filtering function to optical signals 12 traversing between the directional couplers 32a and 32b. The differential phase cell 34 is selected such that the differential path length $\Delta L$ is greater than zero resulting in an asymmetric MZ filter. As is well known in the art, design considerations on the path length of the phase cell arms 44 and 46 provide a mechanism for altering free spectral range of the channels in the resulting demultiplexed signal 24 and/or filtered optical signal 14 (not shown in FIG. 3).

The ring-assisted MZ filter 30 includes one or more resonators 48 optically coupled to the first arm 44 and/or the second arm 46. For example, as illustrated in FIG. 3, the ring-assisted MZ filter 30 includes the resonator 48 optically coupled to the first arm 44. Additionally, multiple resonators 48 may be attached to both the first arm 44 and/or the second arm 46. Preferably, the length of the resonator 48 is equal to twice the differential path length $\Delta L$, i.e. $2\Delta L$.

In the embodiment shown in FIG. 3, the demultiplexer 20 also includes at least two tunable elements 50a and 50b located adjacent to at least one of the arms 44 and 46 and/or to the resonator 48 to permit tuning of the demultiplexing circuit. Preferably, as illustrated in FIG. 3, at least one tunable element 50a is located on the resonator 48, and at least one tunable element 50b is located on the second arm 46. The tunable elements 50a and 50b comprise devices that are thermal, acousto-optic, electro-optic, magneto-optic, piezoelectric, pressure oriented, and/or the like. Preferably, the tunable elements 50a and 50b are thermal devices placed in thermal communication with either or both of the arms 46 and 48 and/or the resonator 48. Examples of suitable thermal devices include heaters, thermoelectric coolers, or any other element that can transfer heat. Preferably, the heater is a resistive heater fabricated by the deposition and patterning of metal films and/or semiconductor materials including platinum, gold, aluminum, chrome, nickel, nichrome, tungsten, polysilicon, and the like.

As is well known in the art, selective heating of the demultiplexing circuit of the demultiplexer 20 alters the refractive index and thereby modulates the phase difference of light propagating through the first arm 44, second arm 46, and/or resonator 48. The tunable elements 50a and 50b cooperatively adjust the phase of the optical signal 12 traversing through the differential cell 34 and the resonator 48. Preferably, the phase of the optical signal 12 through the differential cell 34 and the resonator 48 are adjusted to be substantially similar such that the resulting demultiplexed signals exhibit a box-like shape. In this regard, the resonator 48 serves as an all pass filter for the first arm 44 and adjusts the phase with regard to different optical frequency within the Free Spectral Range (FSR). This adjustment allows the passband of the MZ ring-assisted filter 30 to be wider and exhibit steeper rolloff.

Figure 4:
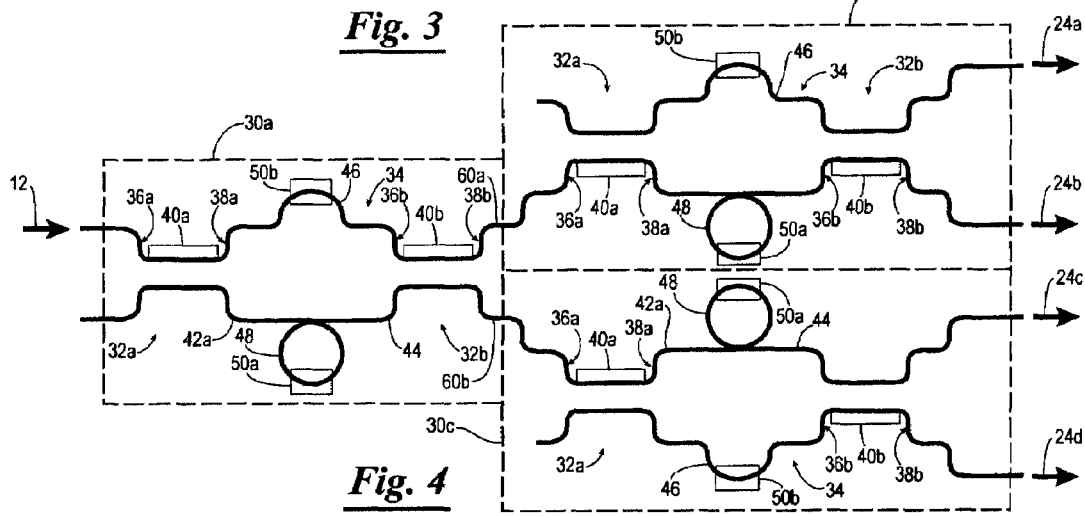
FIG. 4 is a schematic diagram of another exemplary demultiplexer for use in the signal processing systems of FIG. 1 and FIG. 2.

FIG. 4 illustrates another embodiment of the demultiplexer 20a. The demultiplexer 20a includes a demultiplexing circuit having at least three ring-assisted MZ filters 30a, 30b, and 30c. In general, the demultiplexing circuit of the demultiplexer 20a receives the optical signal 12 through the first ring-assisted MZ filter 30a, filters the optical signal 12 using the multiple ring-assisted MZ filters 30a, 30b, and 30c, and provides the resulting demultiplexed signals 24a-d through the second and third ring-assisted MZ filters 30b and 30c.

Each ring-assisted MZ filter 30a, 30b, and 30c includes at least two directional couplers, designated by reference numerals 32a and 32b, and at least one differential phase cell 34 interleaved between the directional couplers 32a and 32b. Each directional coupler 32a and 32b has an input port, an output port, and a coupling region. In particular, directional coupler 32a has an input port 36a, an output port 38a, and a coupling region 40a. In the same regard, directional coupler 32b has an input port 36b, an output port 38b, and a coupling region 40b.

A first branch 60a and a second branch 60b further define the output port 38a of the ring-assisted MZ filter 30a. The first branch 60a connects the output port 38b of ring-assisted MZ filter 30a with the input port 36a of ring-assisted MZ filter 30b for receiving the optical signal 12. The second branch 60b connects the output port 38b of the ring-assisted MZ filter 30a with the input port 36a of the ring-assisted MZ filter 30c for receiving the optical signal 12. It should be appreciated that additional optical signals 12 may be provided and input into the input port 36a of ring-assisted MZ filter 30b and/or 30c depending on the needs of the device.

Figure 5:
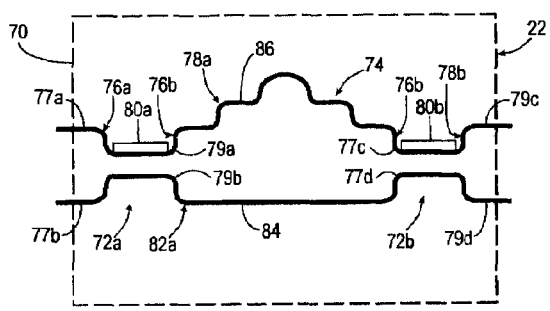
FIG. 5 is a schematic diagram of an exemplary multiplexer for use in the signal processing systems of FIG. 1 and FIG. 2.

FIG. 5 illustrates one version of the multiplexer 22 for use in the signal processing systems 10 or 10a. The multiplexing circuitry of the multiplexer 22 includes at least one MZ filter 70. The MZ filter 70 includes at least two directional couplers, designated by reference numerals 72a and 72b, and at least one differential phase cell 74 interleaved between the directional couplers 72a and 72b. Each directional coupler 72a and 72b has an input port with at least two branches, an output port with at least two branches, and a coupling region. In particular, directional coupler 72a has input port 76a with branches 77a and 77b, output port 78a with branches 79a and 79b, and a coupling region 80a. In the same regard, directional coupler 72b has input port 76b with branches 77c and 77d, output port 78b with branches 79c and 79d, and a coupling region 80b.

The differential phase cell 74 connects directional couplers 72a and 72b by connecting the output port 78a of the directional coupler 72a with the input port 76b of the directional coupler 72b. In a preferred embodiment, the directional couplers 72a and 72b and the differential phase cell 74 are constructed from a first waveguide 82a and a second waveguide 82b. The differential phase cell 74 includes a first arm 84 formed from a portion of the first waveguide 82a and a second arm 86 formed from a portion of the second waveguide 82b. The differential phase cell arms 84 and 86 have lengths $L_3$ and $L_4$ having a differential path length $\Delta L_2$. The differential phase cell 74 causes a differential phase shift and filtering function to signals traversing between the directional couplers 72a and 72b. Preferably, the differential phase cell 74 is selected such that the differential path length $\Delta L_2$ is greater than zero resulting in an asymmetric MZ filter. As is well known in the art, design considerations on the path length of the arms 84 and 86 provide a mechanism for altering free spectral range of the channels in the resulting multiplexed signal 26 and/or filtered signal 14 (not shown in FIG. 5). It should be noted that the design of the multiplexer 22 may include the use of one or more resonators for correcting manufacturing variation and the like.

Figure 6:
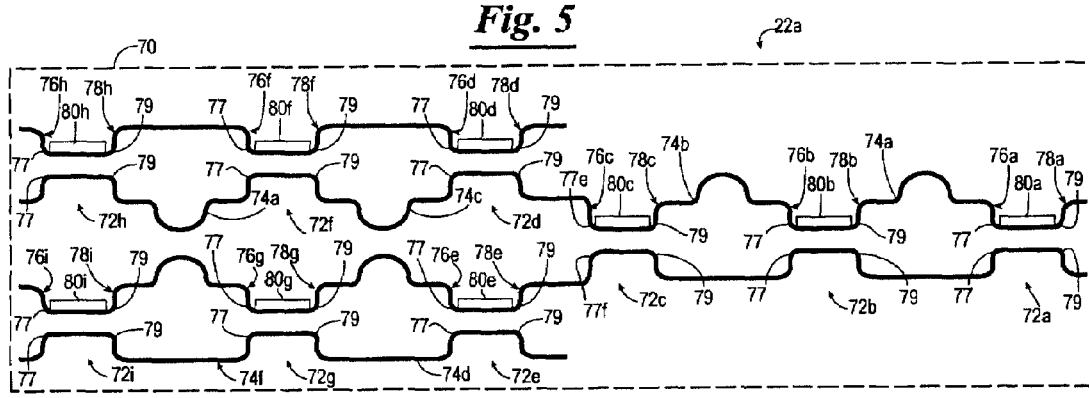
FIG. 6 is a schematic diagram of another exemplary multiplexer for use in the signal processing systems of FIG. 1 and FIG. 2.

FIG. 6 illustrates another embodiment of the multiplexer 22a for use in the systems 10 and 10a. The multiplexer 22a is provided with multiplexing circuitry having a MZ filter 70 (preferably non-ring assisted) comprising multiple directional couplers, designated by reference numerals 72a-72i. In a preferred embodiment, directional coupler 72a is a 3 dB coupler. Each directional coupler 72a-72i has an input port with at least two branches, an output port with at least two branches, and a coupling region. For example, directional coupler 72a has an input port 76a with branches 77a and 77b, and output port 78a with branches 79a and 79b, and a coupling region 80a. In the same regard, directional coupler 72f has an input port 76f with branches 77c and 77d, an output port 78b with branches 79c and 79d, and a coupling region 80f. For purposes of brevity, not all of the input and output ports of the directional couplers 72a-i will be described herein.

The MZ filter 70 also includes differential phase cells 74a-74f interleaved between the directional couplers 72a-72i. Each differential phase cell 74a-74f connects directional couplers 72a-72i by connecting one of the branches of the output ports of one directional coupler with one of branches of the input ports of another directional coupler. For example, the output port 78f of the directional coupler 72f is connected by differential phase cell 74c to the input port 76d of directional coupler 72d. This configuration places differential phase cell 74a and 74b in series. Additionally, the output ports of one directional coupler may be connected to the input ports of two directional couplers. For example, the branches 77e and 77f of input port 76c of directional coupler 72c is connected to the branches 79h and 79i of output ports 72d and 72e. This configuration places differential phase cells 74c and 74d in parallel. By connecting the differential phase cells 74a-74f in series and/or parallel, a chain is formed as illustrated in FIG. 6.

As previously discussed, both the MZ filter 70 and the ring-assisted MZ filter 30 have been used in the art separately for multiplexing and demultiplexing optical signals 12. Both the MZ filter 70 and the ring-assisted MZ filter 30 have desired characteristics for providing filtered signals 14. Thus, the present invention preferably combines desired characteristics of the MZ filter 70 and the ring-assisted MZ filter 30 to minimize chromatic dispersion in the resulting filtered signal 14. For example, FIG. 7 illustrates the response of the demultiplexer 20 including the ring-assisted MZ filter 30 as described herein. Optical signals 12 input solely in the demultiplexer 20 produce filtered signals 14 having negative-sloped chromatic dispersion of ps/nm over a set frequency but provide for desired characteristic of high spectral efficiency and high isolation between different channels. In order to compensate for the chromatic dispersion, the multiplexer 22, in FIG. 8, is designed to produce the function of chromatic dispersion of opposing shape to the function of chromatic dispersion introduced by the demultiplexer 20. Such a design counteracts or effectively cancels at least a portion of the chromatic dispersion of the demultiplexer 20, the results of which are evident in FIG. 9. As the multiplexer 22 doesn't require wide rejection bands and high isolation from neighboring channels, MZ filters 70 with low order will see little signal penalties.

Figure 10:
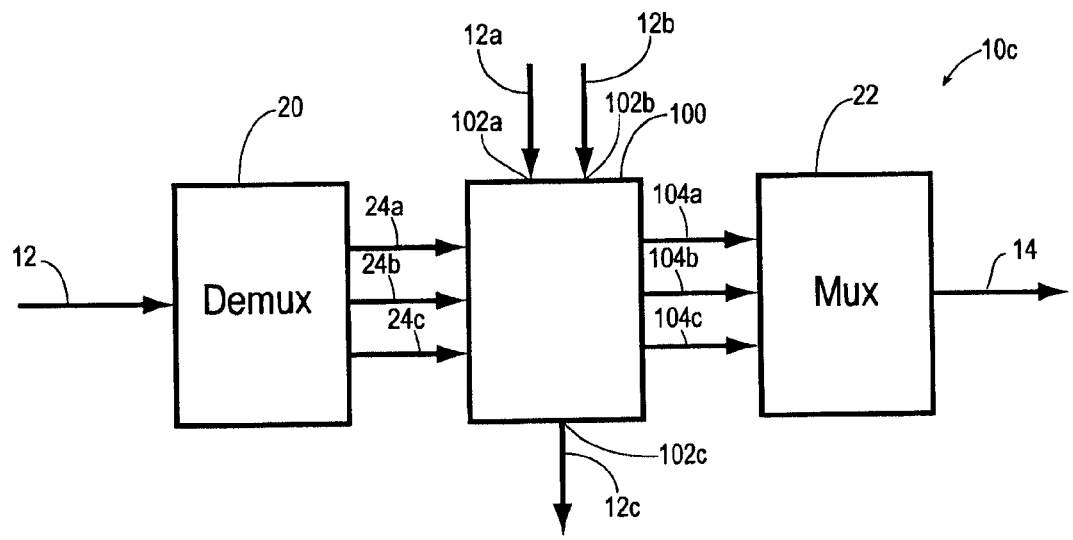
FIG. 10 is a schematic diagram of another exemplary signal processing system that includes a demultiplexer, add-drop processing system, and multiplexer in accordance with the present invention.

An intermediate device, such as a variable optical attenuator (VOA), switch, other filters, optical taps, and/or the like can be placed between the demultiplexer 20 and the multiplexer 22 based on the needs of the designer without deterring from the teachings of the invention. For example, as illustrated in FIG. 10, shown therein, the signal processing system 10c includes the demultiplexer 20, multiplexer 22, and an add-drop processing system 100 providing routing and processing of optical signals 12a-c into or out of a single mode fiber, for example. The add-drop processing system 100 reconfigures paths between the demultiplexer 20, the multiplexer, and a series of ports 102a-c for adding and/or dropping optical signals 12a-c.

The demultiplexer 20 separates the optical signals 12 into demultiplexed optical signals 24a-c and outputs the demultiplexed optical signals 24a-c to the add-drop processing system 100. The add-drop processing system 100 receives the demultiplexed optical signals 24a-c and converts the demultiplexed optical signals 24a-c into processing signals 104a-c. The add-drop processing system 100 reconfigures the path of the demultiplexed optical signals 24a-c by dropping the demultiplexed optical signals 24a-c and/or adding optical signals 12a and/or 12b. The resulting processing signals 104a-c are then transmitted to the multiplexer 22.

Figure 11:
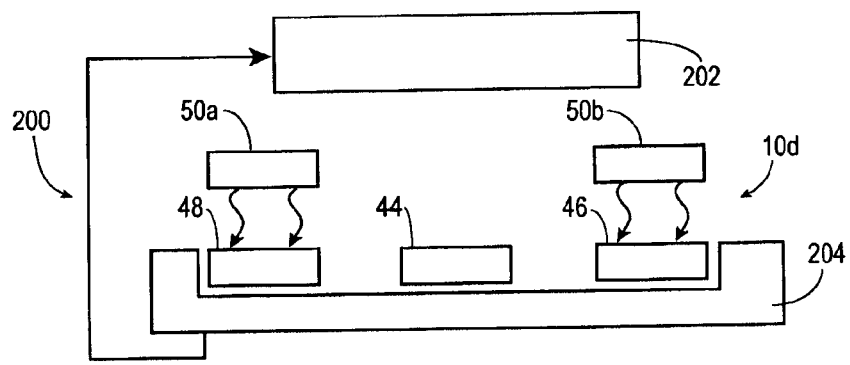
FIG. 11 is a schematic block diagram of a control system for use with the signal processing system having tunable elements depicted in FIGS. 3 and 4.

Referring now to FIG. 11, shown therein is an embodiment of the signal processing system 10d including a control system 200 to adjust, regulate, and/or control the power dissipation of tuning elements 50a and 50b. By way of example, the control system 200 will be described for controlling the tuning elements 50a and 50b of the demultiplexer 20 illustrated within FIG. 3. However, it should be understood that the following description is equally applicable to control the tuning elements of any demultiplexer suitable for use within the signal processing systems 10 or 10a.

The control system 200 includes a controller 202 and a feedback mechanism 204. Preferably, the feedback mechanism 204 functions automatically, i.e., without any human intervention. However, the feedback mechanism 204 may also be user operated or polled. In either case, the controller 202 receives signals from the feedback mechanism indicative of one or more physical aspects related to the tuning of the tuning elements 50a and 50b and then utilizes such signals to control the tuning elements 50a and 50b. For example, the control system can assist in the offline calibration of the demultiplexer 20 or the multiplexer 22 by receiving signals from the feedback mechanism indicative of crosstalk and passband offset.

In one embodiment, the controller 202 can alter the output phase of waveguides 46 and/or resonator 48 and/or alter the power dissipation of the tuning elements 50a and/or 50b based on a bit error rate (BER). The BER is the ratio of the number of failed bits to the total number of bits sent over the channel of the optical signal 12. As the communication system changes, there are generally several points within the system at which BER is determined. The controller 202 can measure for the BER and/or extract information indicative of the BER from a source external to the demultiplexer 20. In this example, the controller 202 adjusts the tuning elements 50a and 50b to compensate for the BER.

Figure 12:
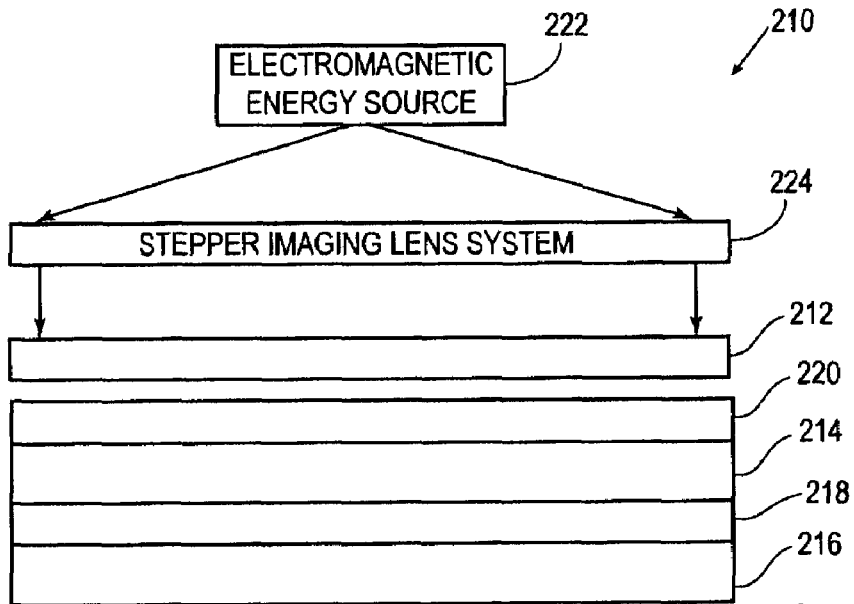
FIG. 12 is a diagrammatic view of an exemplary photolithography system for transferring patterns of a signal processing system on a photomark to a thin film optical material on a substrate in accordance with the present invention.

Referring now to FIG. 12, the demultiplexer 20 and the multiplexer 22 of the signal processing systems 10a-d can be implemented as part of (or an entire) integrated planar lightwave circuit utilizing any fabrication technology known in the art. The demultiplexer 20, the multiplexer 22 and the add-drop processing system 100 can be formed as parts of a single planar lightwave circuit formed on one substrate, or the demultiplexer 20, the multiplexer 22 and the add-drop processing system 100 can be formed as separate planar lightwave circuits which are interconnected by any suitable communication link, such as single mode optical fiber.

For purposes of brevity, the following will describe a method for constructing the demultiplexer 20 of the signal processing systems 10a-d. However, it should be understood that the following description is equally applicable to constructing other parts of the systems 10a-d.

Shown in FIG. 12 and designated by a reference numeral 210 is an exemplary photolithography system for transferring one or more patterns of the demultiplexing circuitry of the demultiplexer 20 on a photomask 212 to a core material 214 on a substrate 216 in accordance with the present invention. In this embodiment, the core material 214 is a thin film constructed of a material selected from a group consisting of silica, doped silica, silicon oxynitride, silicon oxycarbide, Indium Phosphide, Gallium Arsenide, high index polymers, and other material suitable for making optical waveguides including combinations thereof. The core material 214 is deposited on a cladding material 218 constructed of a material having an index of refraction that is lower than the index of refraction of the core material 214. The cladding material 218 can be selected from a group consisting of silica, lower index silicon oxynitride, lower index silicon oxycarbide, Indium Galium Phosphide, polymers, and other material suitable for making optical waveguides including combinations thereof. Various examples of combinations of thin film for forming the core material 214 and cladding material 218 are discussed in U.S. Pat. No. 6,614,977, the entire content of which is hereby incorporated herein by reference.

A photoresist layer 220 is disposed on the core material 214. In general, the photoresist layer 220 is constructed of a material that prevents material beneath the photoresist layer 220 from being removed or material directly underneath the photoresist layer 220 to be removed during a subsequent process for removing predetermined parts of the core material 214, such as an etching process. Thus, the photoresist layer 220 can be either a positive photoresist or a negative photoresist. The present invention will be described herein by way of example as the photoresist layer 220 being a positive photoresist and in side-elevation. The photoresist layer 220 can be provided on the core material 214 utilizing any suitable process, such as spin coating, for example.

The photolithography system 210 is also provided with an electromagnetic energy source 222 directing energy through a stepper imaging lens system 224 and the photomask 212 to the photoresist layer 220. The electromagnetic energy source 222, such as a high intensity ultraviolet light source or the like, provides electromagnetic energy capable of reacting with the photoresist layer 220 to transfer the pattern on the photomask 212 to the photoresist layer 220.

The stepper imaging lens system 224 receives the electromagnetic energy from the electromagnetic energy source 222 and directs such energy to the photomask 212 which exposes parts of the photoresist layer 220 to the electromagnetic energy. Such exposure can be by any suitable method, such as contact, proximity, and projection.

Figure 13:
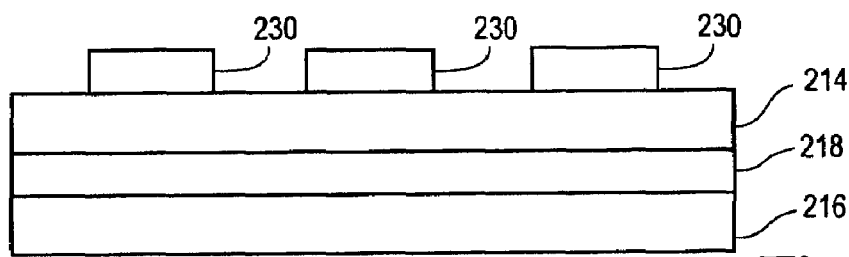
FIG. 13 is a diagrammatic view of an exemplary positive mark of a signal processing system formed on the thin film optical material utilizing the photography system of FIG. 12.
Figure 14:
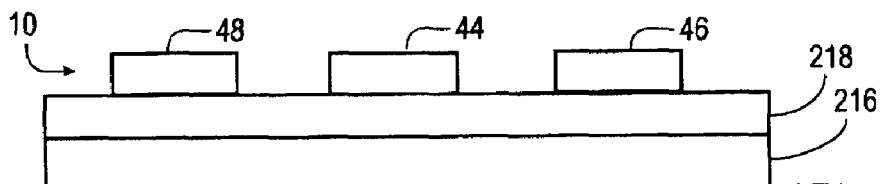
FIG. 14 is a diagrammatic view of a signal processing system formed from the thin film optical material using the mark depicted in FIG. 13.

Once the photoresist layer 220 has been exposed, then such photoresist layer 220 is developed to form a mask 230 in the geometry of the demultiplexing circuitry of the demultiplexer 20 as partially shown in FIG. 13. Once the mask 230 is formed, then the pattern formed by the mask 230 is transferred into the core material 214 to form at least a portion of the demultiplexing circuitry of the demultiplexer 20 as shown in FIG. 14. The transferring can be accomplished by any suitable process, such as an etching process. It should be understood that the demultiplexer 20 or other portions of the signal processing system 10 referred to herein may be formed using standard or later developed techniques used in the semiconductor industry to deposit and pattern optical waveguide materials, e.g., (dry-etch, wet-etch, flame hydrolysis deposition (FHD), chemical vapor deposition (DVD), reactive ion etching (RIE), physically enhanced CVD (PECVD), or the like. It should be understood that multiple different photomasks 212 and/or etching steps can be utilized to form the demultiplexing circuitry of the demultiplexer 20.

Figure 15:
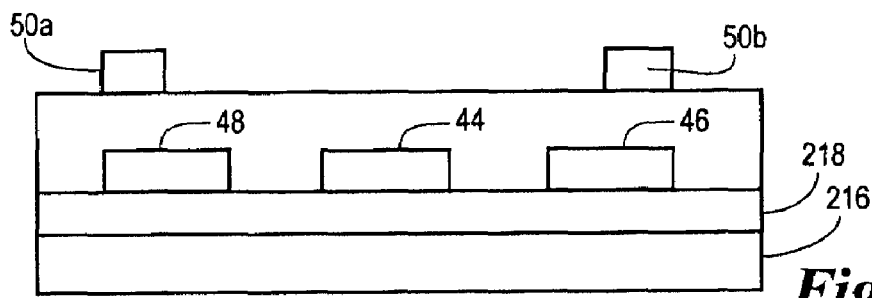
FIG. 15 is a diagrammatic view of a signal processing system including tunable elements.

Once the demultiplexing circuitry of the demultiplexer 20 is formed, the mask 230 is removed, and another layer of cladding material (not shown) can then be deposited over the entire surface and planarized if necessary utilizing any suitable process. For example, a process for applying another layer of cladding material is discussed in U.S. Pat. No. 6,768, 828 entitled "Integrated Optical Circuit with Dense Planarized Cladding Layer"; the entire content of which is hereby expressly incorporated herein by reference. Optionally, the tuning elements 50a and 50b are positioned in communication with the arm 46 and resonator 48 of the demultiplexing circuitry of the demultiplexer 20. As illustrated in FIG. 15, the tuning elements 50a and 50b can be layered above the layer of cladding material 234. However, it should be understood that the tuning elements 50a and 50b can be positioned in other locations relative to the arm 46 and the resonator 48. For example, the tuning elements 50a and/or 50b may be located within the layer of cladding material 234.

While the above methods for fabricating the signal processing system 10 and 10a of the present invention are described above in terms of fabricating one signal processing system 10a-d, it should be apparent to those skilled in the art that such fabrication methods, as well as any other appropriate fabrication techniques currently known in the art or later developed, can be utilized to fabricate one or more signal processing systems 10a-d, or portions thereof.

Computer software code can be utilized to allow a user to construct a virtual representation of the signal processing systems 10a-d or a portion thereof. For example, such a tool can be implemented utilizing Optical Waveguide Mode Suite (OWMS) and Beam propagation solver software available from Apollo Photonics Corp. of Burlington, Ontario, Canada. This software also allows for numeric simulation using a full vector Beam Propagation Method (FV-BPM) (see also, W. P Huang and C. L. Xu, "Simulation of three-dimensional optical waveguides by a full-vector beam propagation method," IEEE J. Selected Topics in Quantum Electronics, vol. 29, pp. 2639-2649, 1993, the entire content of which is hereby incorporated herein by reference.). The FV-BPM takes into account polarization effects including rotation of the optical field.

For example, software code stored on one or more computer readable medium and executed by a suitable processor can be used to provide a user interface to the user (e.g., via a monitor of a computer system) which receives input from the user (e.g., via a keyboard and/or mouse of the computer system). The user can input information into the user interface that defines one or more parameters associated with any of the signal processing systems 10a-d or an intermediate device of any of the signal processing systems 10a-d. The software code can then store the inputted parameters on the one or more computer readable medium and utilize the inputted parameters to generate and display a virtual representation of any of the signal processing systems 10a-d (portions thereof or an intermediate device of any of the signal processing systems 10a-d corresponding to such parameters. Such parameters received from the user can include for example one or more of the following: width, length of shape of any of the signal processing systems 10a-d, demultiplexer 20, multiplexer 22, and/or any other geometric feature or property of any of the signal processing systems 10a-d.

As discussed above, in one embodiment, the virtual representation can be used to simulate the geometries and properties associated with any of the resulting signal processing systems 10a-d. Further, such a virtual representation can be incorporated into a design application (such as OWMS) which allows the virtual representation to be positioned within a design in combination with other elements to form planar light-wave circuits, such as in the design of chips and/or wafers having a plurality of chips. Such capability allows the signal processing system 10 designed by the user (or having predetermined parameters) to be evaluated in combination with other elements in an optical circuit.

WDM systems allow capacity expansion of a network without having to lay out more optical fibers since capacity of a given link can be expanded by simply upgrading any of the signal processing systems 10a-d. Contemplated herein is a method for reducing the chromatic dispersion in an existing optical network system. This method generally includes the step of distributing at least one set of the demultiplexer 20 and the multiplexer 22 that are matched as described herein to reduce chromatic dispersion. The matched set of the demultiplexer 20 and the multiplexer 22 can be used for repair and/or upgrade of the existing optical network system. The method includes the steps of removing a demultiplexer and a multiplexer of the existing optical network system and then installing the matched set of the demultiplexer 20 and the multiplexer 22.

Figure 16:
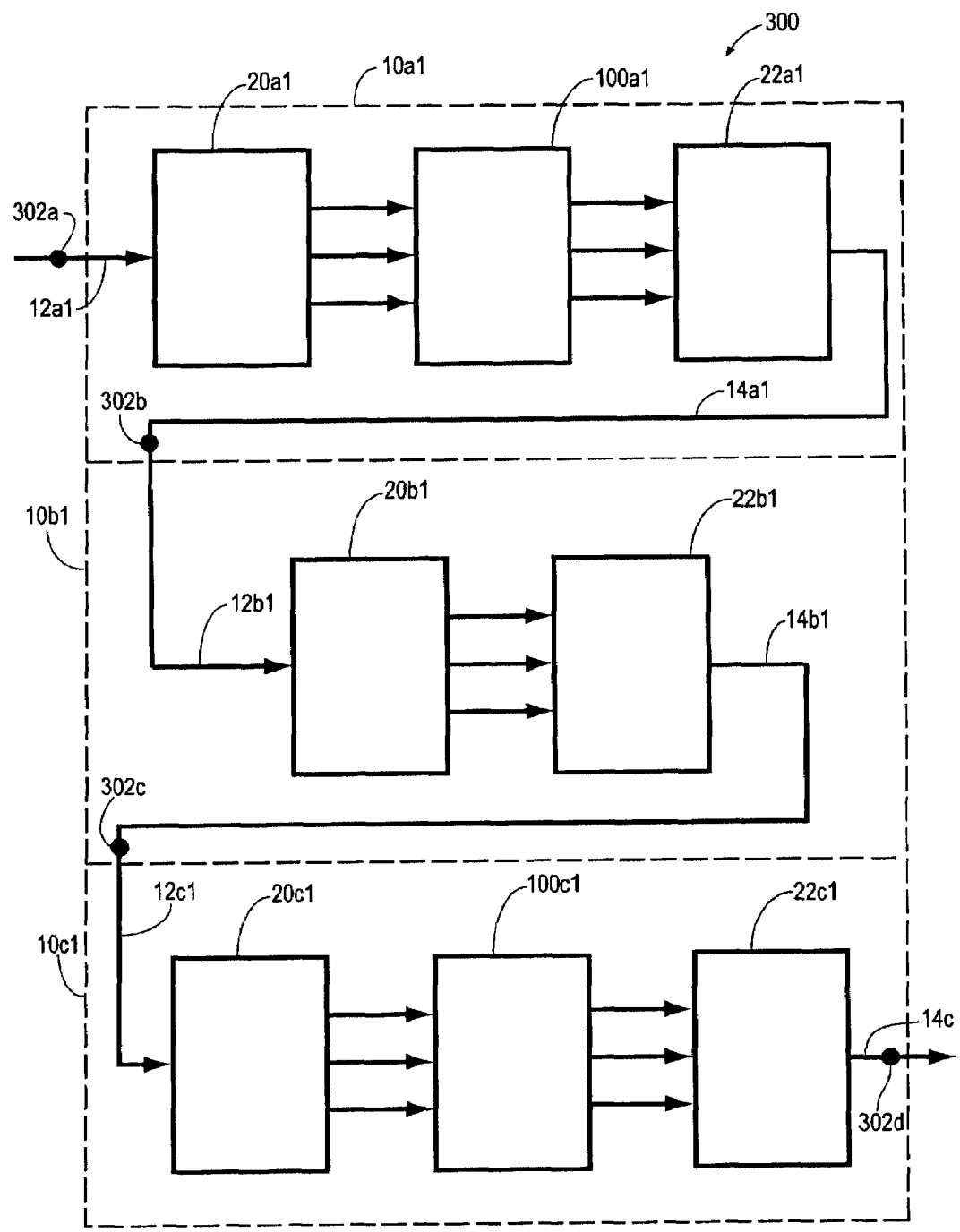
FIG. 16 is a schematic block diagram of multiple signal processing systems in an optical network in accordance with the present invention.

FIG. 16 is a schematic block diagram illustrating the use of multiple signal processing systems 10a1-10c1 in an optical network system 300 in accordance with the present invention. Each optical system 10a1-10c1 is designed for demultiplexing and then multiplexing at least one optical signal to provide at least one filtered optical signal having minimal chromatic dispersion induced by the signal processing systems 10a1-10c1 within the passband of the signal processing systems 10a1-10c1. In particular, signal processing system 10a1 is designed for demultiplexing and then multiplexing optical signal 12a1 and providing filtered optical signal 14a1. In the same regard, signal processing system 10b1 is designed for demultiplexing and then multiplexing optical signal 12b1 and providing filtered optical signal 14b1 and signal processing system 10c1 is designed for demultiplexing and then multiplexing optical signal 12c1 and providing filtered optical signal 14c1. As a point of reference, nodes 302a-302d serve as a theoretical reference points at which the chromatic dispersion of the optical signals traveling through the optical network 300 are measured. That is, the chromatic dispersion of 12a1 measured at 302a will have a value $x_{a1}$ indicative of the function of chromatic dispersion within the optical signal 12a1. In accordance with the present invention, each signal processing system 10a1-10c1 does not introduce significant amounts of chromatic dispersion into the optical signals traveling through the optical network 300 throughout the passband e.g., ±8 Ghz, of the signal processing systems 10a1-10c1. Thus, the function of chromatic dispersion within the passband at each node 302a-d will be substantially equal to the value $x_{a1}$ measured at node 302a.

It will be understood from the foregoing description that various modifications and changes may be made in the preferred and alternative embodiments of the present invention without departing from its true spirit. For example, the demultiplexer 20 and the multiplexer 22 can both use higher order MZ filters than that described above to achieve nearly zero total chromatic dispersion within the passband, rather than the demultiplexer 20 using the ring-assisted MZ type filter. However, increasing the order of the MZ filters may also increase the number of thermal optical delay controls and also increase the complexity of the control system. Simplicity of design within the description refers to design parameter considerations known within the art and may include financial and practical considerations for use of the device. This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A signal processing system having a passband, comprising:

a demultiplexer having an input port to receive an optical signal, a first plurality of branches to provide a plurality of demultiplexed optical signals, and demultiplexing circuitry, the demultiplexing circuit being configured to demultiplex the optical signal received at the input port to provide each of the plurality of demultiplexed optical signals to a corresponding one of the first plurality of branches, the demultiplexing circuitry introducing a first function of chromatic dispersion within a passband into the demultiplexed optical signals, the first function of chromatic dispersion within the passband having a first magnitude and a first sign; and a multiplexer having a second plurality of branches receiving the plurality of demultiplexed optical signals, an output port to provide a multiplexed optical signal, and multiplexing circuitry coupled between the second plurality of branches and the output port of the multiplexer for multiplexing the plurality of demultiplexed optical signals received by the second plurality of branches to provide the multiplexed optical signal to the output port, the multiplexing circuitry introducing a second function of chromatic dispersion within the passband into the multiplexed optical signal, the second function of chromatic dispersion having a second magnitude and a second sign opposite the first sign within the passband, such that a total function of chromatic dispersion in the passband corresponding to a sum of the first and second functions of chromatic dispersion has a third magnitude, which is less than the first magnitude.

2. The signal processing system of claim 1, wherein the demultiplexing circuitry comprises:

a first directional coupler and a second directional coupler, the first directional coupler receiving the optical signal from the first plurality of branches and the second directional coupler providing the plurality of demultiplexed optical signals;

a differential phase cell connecting the first directional coupler and the second directional coupler, the differential phase cell having a first arm with a path length $L_1$ and a second arm with a path length $L_2$, wherein the path lengths $L_1$ and $L_2$ are unequal so as to provide a first phase response to the optical signal; and a resonator optically coupled to the second arm of the differential phase cell, the resonator having a path length $L_R$ so as to provide a second phase response to the optical signal.

3. The signal processing system of claim 2, wherein the demultiplexing circuitry further comprises:

a first tunable element in thermal communication with the first arm of the first differential phase cell;

a second tunable element in thermal communication with the resonator; wherein at least one of the first tunable element and the second tunable element are tuned to adjust at least one of the first and second phase responses such that the first and second phase responses are substantially equal at an output end of the second directional coupler.

4. The signal processing system of claim 3, wherein at least one of the first tunable element and the second tunable element is a thermal device.

5. The signal processing system of claim 3, further comprising a controller selectively providing a control signal to at least one of the first tunable element and second tunable element to adjust power dissipation.

6. The signal processing system of claim 5, wherein the controller selectively provides the signal to at least one of the first tunable element and second tunable element based on a bit rate error associated with the optical signal.

7. The signal processing system of claim 2, the first differential phase cell includes a first waveguide and a second waveguide, the first directional coupler, and the second directional coupler.

8. The signal processing system of claim 2, further including a ring-assisted Mach-Zehnder filter, the first differential phase cell connects to the first directional coupler and the second directional coupler demultiplexer to thereby constitute the ring-assisted Mach-Zehnder filter.

9. The signal processing system of claim 2, wherein the differential phase cell is a first differential phase cell, the multiplexing circuitry further comprises:

a third directional coupler and a fourth directional coupler, the third directional coupler receiving the demultiplexed optical signal and the fourth directional coupler providing at least one filtered signal; and, a second differential phase cell connecting the third directional coupler and the fourth directional coupler, the second differential phase cell having a third arm with a path length $L_3$ and a fourth arm with a path length $L_4$, wherein the path lengths $L_3$ and $L_4$, are unequal.

10. The signal processing system of claim 1, wherein the third magnitude is substantially equal to zero.

11. A signal processing system having a passband, comprising:

a multiplexer having a first plurality of branches receiving a plurality of optical signals, an output port to provide a multiplexed optical signal, and multiplexing circuitry coupled between the the plurality of branches and the output port of the multiplexer for multiplexing the plurality of optical signals received by the branches to provide the multiplexed optical signal to the output port, the multiplexing circuitry introducing a first function of chromatic dispersion within a passband into the multiplexed optical signal, the first function of chromatic dispersion within the passband having a first magnitude and a first sign; and, a demultiplexer having an input port to receive the multiplexed optical signal, a second plurality of branches, and demultiplexing circuitry coupled to the input port for demultiplexing the multiplexed optical signal received at the input port to provide a plurality of demultiplexed optical signals to the second plurality of branches, the demultiplexing circuitry introducing a second function of chromatic dispersion into the demultiplexed optical signals, the second function of chromatic dispersion having a second magnitude and a second sign opposite the first sign within the passband, such that a total function of chromatic dispersion in the passband corresponding to a sum of the first and second functions of chromatic dispersion has a third magnitude, which is less than the first magnitude.

12. The signal processing system of claim 11, wherein the demultiplexing circuitry comprises:

a first directional coupler and a second directional coupler, the first directional coupler receiving the multiplexed optical signal and the second directional coupler providing the plurality of demultiplexed optical signals;

a differential phase cell connecting the first directional coupler and the second directional coupler, the first differential phase cell having a first arm with a path length $L_1$ and a second arm with a path length $L_2$, wherein the path lengths $L_1$ and $L_2$, are unequal so as to provide a first phase response to the optical signal; and a resonator optically coupled to the second arm of the differential phase cell, the resonator having a path length $L_R$ so as to provide a second phase response to the optical signal.

13. The signal processing system of claim 12, wherein the demultiplexing circuitry further comprises:
    a first tunable element in thermal communication with the first arm of the first differential phase cell;
    a second tunable element in thermal communication with the resonator; wherein at least one of the first tunable element and the second tunable element are tuned to adjust at least one of the first and second phase responses such that the first and second phase responses are substantially equal at an output end of the second directional coupler.

14. The signal processing system of claim 13, wherein at least one of the first tunable element and the second tunable element is a thermal device.

15. The signal processing system of claim 13, further comprising a controller selectively providing a control signal to at least one of the first tunable element and second tunable element to adjust power dissipation.

16. The signal processing system of claim 15, wherein the controller selectively provides the signal to at least one of the first tunable element and the second tunable element based on a bit rate error.

17. The signal processing system of claim 12, further including a ring-assisted Mach-Zehnder filter, wherein the first differential phase cell connects to the first directional coupler and the second directional coupler demultiplexer to thereby constitute a ring-assisted Mach-Zehnder filter.

18. The signal processing system of claim 12, further including a first waveguide and a second waveguide, the first differential phase cell, first directional coupler, and second directional coupler including the first and second waveguides.

19. The signal processing system of claim 12, wherein the differential phase cell is a first differential phase cell, the multiplexing circuitry further comprises:
    a third directional coupler and a fourth directional coupler, the third directional coupler receiving one of the plurality of demultiplexed optical signals and the fourth directional coupler providing at least one filtered signal; and,
    a second differential phase cell connecting the third directional coupler and the fourth directional coupler, the second differential phase cell having a third arm with a path length $L_3$ and a fourth arm with a path length $L_4$, wherein the path lengths $L_3$ and $L_4$, are unequal.

20. The signal processing system of claim 11, wherein the third magnitude is substantially equal to zero.

21. A wavelength division multiplexing system, comprising:
    a wavelength division multiplexer configured to provide a wavelength division multiplexed optical signal; and
    a wavelength division demultiplexer in series with the wavelength division multiplexer to demultiplex the wavelength division multiplexed optical signal, the wavelength division multiplexer has an associated chromatic dispersion having a first magnitude and a first sign and the wavelength division demultiplexer has a second magnitude and a second sign opposite the first sign, wherein a sum of the first and second magnitudes is substantially equal to zero.

22. The wavelength division multiplexing system of claim 21, wherein the wavelength division multiplexer and the wavelength division demultiplexer have different filter characteristics.

* * * * *